United States Patent
Matsumoto

(10) Patent No.: US 9,389,811 B2
(45) Date of Patent: Jul. 12, 2016

(54) IMAGE PROCESSING APPARATUS, IMAGE PROCESSING METHOD, AND RECORDING MEDIUM

(75) Inventor: Koichi Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 12/911,465

(22) Filed: Oct. 25, 2010

(65) Prior Publication Data

US 2011/0035659 A1 Feb. 10, 2011

Related U.S. Application Data

(63) Continuation of application No. PCT/JP2010/060994, filed on Jun. 28, 2010.

(30) Foreign Application Priority Data

Jun. 30, 2009 (JP) ................................ 2009-155310

(51) Int. Cl.
*G06F 17/00* (2006.01)
*G06F 3/12* (2006.01)
*G06T 11/60* (2006.01)

(52) U.S. Cl.
CPC ............ *G06F 3/1204* (2013.01); *G06F 3/1246* (2013.01); *G06F 3/1288* (2013.01); *G06T 11/60* (2013.01)

(58) Field of Classification Search
CPC ............................. G06F 3/1204; G06F 3/1288
USPC .......................................... 715/234; 345/864
See application file for complete search history.

(56) References Cited

U.S. PATENT DOCUMENTS

| | | | |
|---|---|---|---|
| 6,366,923 B1* | 4/2002 | Lenk et al. ..................... 707/706 |
| 6,763,388 B1* | 7/2004 | Tsimelzon ..................... 709/228 |
| 6,832,351 B1* | 12/2004 | Batres ............................ 715/234 |
| 6,832,353 B2* | 12/2004 | Itavaara et al. ................ 715/744 |
| 6,976,210 B1* | 12/2005 | Silva et al. ..................... 715/205 |
| 6,983,328 B2* | 1/2006 | Beged-Dov ............ H04L 67/20 709/202 |
| 7,039,643 B2* | 5/2006 | Sena et al. ..................... 707/691 |
| 7,047,033 B2* | 5/2006 | Wyler ......................... 455/552.1 |
| 7,685,514 B1 | 3/2010 | Khatwani et al. |

(Continued)

FOREIGN PATENT DOCUMENTS

JP 3588337 B2 11/2004
JP 2005-224944 A 8/2005

(Continued)

OTHER PUBLICATIONS

Snag-it Help Document available at http://www.techsmith.com as of May 15, 2010 ( pp. 1-3, 76, 155).*

*Primary Examiner* — William Bashore
*Assistant Examiner* — Nathan Shrewsbury
(74) *Attorney, Agent, or Firm* — Canon USA, Inc. I.P. Division

(57) ABSTRACT

A display device is caused to display information indicating a pattern for determining an output target area in a web page, and an output target area in a web page that is being displayed using a browser is determined in accordance with a pattern corresponding to information instructed by a user among the displayed information. Then, an image corresponding to the determined output target area in the web page is output in a manner distinguishable from images corresponding to another area in the web page.
Therefore, a user can easily select an output target area in a web page.

21 Claims, 7 Drawing Sheets

(56) References Cited

U.S. PATENT DOCUMENTS

| | | | |
|---|---|---|---|
| 7,903,277 B2* | 3/2011 | Cudd et al. | 358/1.18 |
| 8,386,914 B2* | 2/2013 | Baluja | G06F 17/30873 707/728 |
| 2002/0143814 A1* | 10/2002 | Hepworth et al. | 707/512 |
| 2002/0186262 A1* | 12/2002 | Itavaara et al. | 345/864 |
| 2004/0105127 A1* | 6/2004 | Cudd et al. | 358/1.18 |
| 2005/0028086 A1* | 2/2005 | Itavaara et al. | 715/513 |
| 2008/0022229 A1* | 1/2008 | Bhumkar et al. | 715/838 |
| 2008/0168388 A1* | 7/2008 | Decker | 715/800 |
| 2008/0184138 A1* | 7/2008 | Krzanowski et al. | 715/760 |
| 2008/0270890 A1* | 10/2008 | Stern | G06F 17/30905 715/238 |
| 2008/0307308 A1* | 12/2008 | Sullivan et al. | 715/723 |
| 2009/0055727 A1* | 2/2009 | Hansen et al. | 715/234 |

FOREIGN PATENT DOCUMENTS

| | | |
|---|---|---|
| JP | 2007-094950 A | 4/2007 |
| JP | 2008-005428 A | 1/2008 |

* cited by examiner

FIG. 7

| DISPLAY ORDER | ID | CLIPPING CANDIDATE FRAME FILE NAME | ASSOCIATED WEB ADDRESS |
|---|---|---|---|
| Top | Pa | pa.kkw | http://xxxxx.jp. |
| \| | Pb | pb.kkw | \| |
| \| | Pc | pc.kkw | \| |
| \| | Pm | pm.kkw | http://www.xxx.com/ |
| \| | Pn | pn.kkw | \| |
| \| | Po | po.kkw | \| |
| \| | Pp | pp.kkw | \| |
| Bottom | P0001 | p0001.kkw | ★ |

701 702 703 704

IMAGE PROCESSING APPARATUS, IMAGE PROCESSING METHOD, AND RECORDING MEDIUM

This application is a Continuation of International Application No. PCT/JP2010/060994, filed Jun. 28, 2010, which claims the benefit of Japanese Patent Application No. 2009-155310, filed Jun. 30, 2009, both of which are hereby incorporated by reference herein in their entirety.

TECHNICAL FIELD

The present invention relates to an image processing apparatus that determines and outputs an output target area in a web page.

BACKGROUND ART

A technique for accessing a server on the Internet and displaying web pages on a display device has recently been known. Those web pages include hierarchical elements such as text and images, and are displayed based on structured documents written in markup language (structured language). Examples of the markup language include HTML (Hyper Text Markup Language) and XHTML (Extensible Hyper Text Markup Language). When a web page is displayed, software called a browser corresponding to the markup language analyzes a structured document, and therefore the web page can be displayed on a display.

Further, when such a web page is printed, in addition to a method for printing an entire web page that is being displayed on a display using a browser, a method for printing a portion of the web page is available. For example, PTL 1 describes a method in which a user selects a portion of a web page that is being displayed by using a pointing device such as a mouse and prints the selected portion.

CITATION LIST

Patent Literature

PTL 1 Japanese Patent No. 03588337

In the method described in PTL 1 above, however, the user needs to select an output target each time a web page is displayed. For example, even if similar output target areas in a plurality of web pages are selected, the user needs to perform the operation of selecting a portion of each web page.

Accordingly, the present invention provides an image processing apparatus that allows a user to easily select an output target area in a web page.

SUMMARY OF INVENTION

The present invention provides an image processing apparatus including a display control unit configured to cause a display device to display information indicating a pattern for determining an output target area in a web page; a determining unit configured to determine an output target area in a web page that is being displayed on the display device using a browser in accordance with a pattern corresponding to information instructed by a user within the information displayed by the display control unit; and an output unit configured to output an image corresponding to the output target area in the web page determined by the determining unit in a manner distinguishable from images corresponding to another area in the web page.

Further features of the present invention will become apparent from the following description of exemplary embodiments with reference to the attached drawings.

BRIEF DESCRIPTION OF DRAWINGS

FIG. 7 is a diagram illustrating a clipping candidate frame pattern table.

DESCRIPTION OF EMBODIMENTS

A preferred embodiment of the present invention will be described in detail with reference to the accompanying drawings. It is to be noted that the following embodiment is not intended to limit the present invention as defined in the claims, and, in addition, all combinations of features described in the embodiment may not necessarily be essential to the means of solution provided by the present invention.

Figure 1:
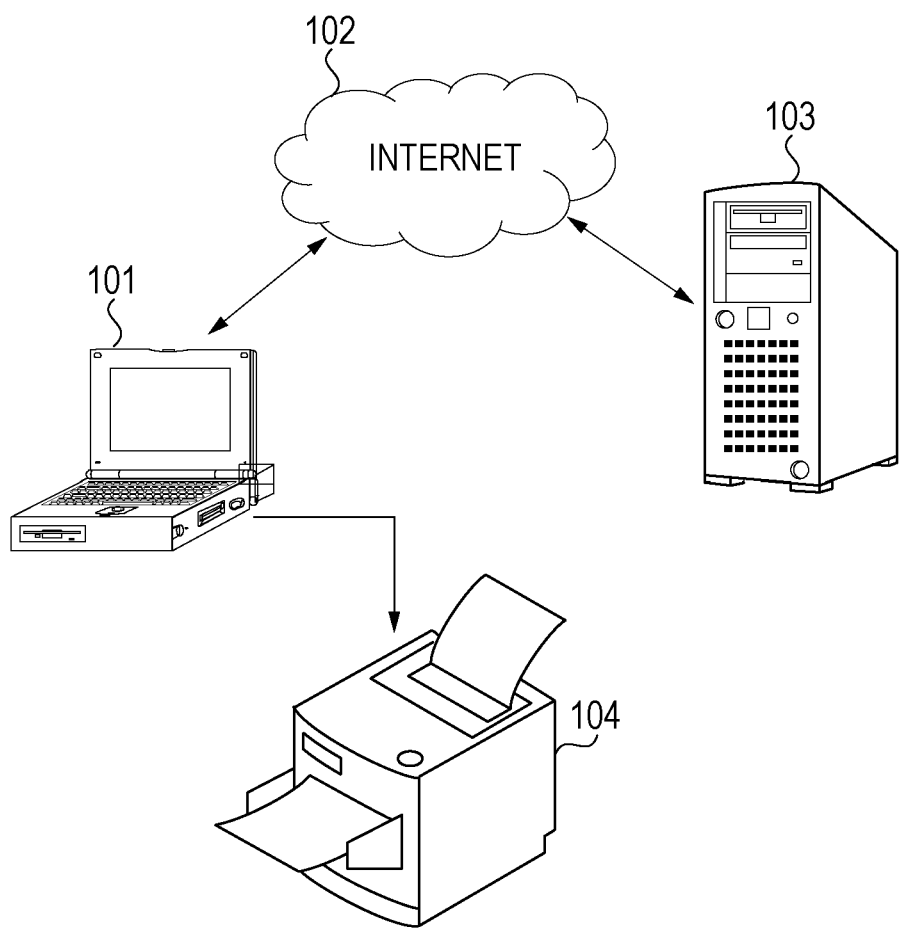
FIG. 1 is a diagram illustrating a printing system for printing a web page based on a structured document.

FIG. 1 is a diagram illustrating a printing system for printing a web page based on a structured document. A PC (Personal Computer) 101 serving as an image processing apparatus according to this exemplary embodiment is connected to the Internet 102, and downloads web pages into the PC 101 from a plurality of WWW servers 103 via the Internet 102 for display. A web page is a structured document written in markup language (structured language) such as HTML or XHTML, and is displayed based on the content of the written structured document. Further, the PC 101 is locally connected to a printer 104, and is capable of downloading web pages on the WWW servers 103 onto the PC 101 and printing the web pages using the printer 104.

Figure 2:
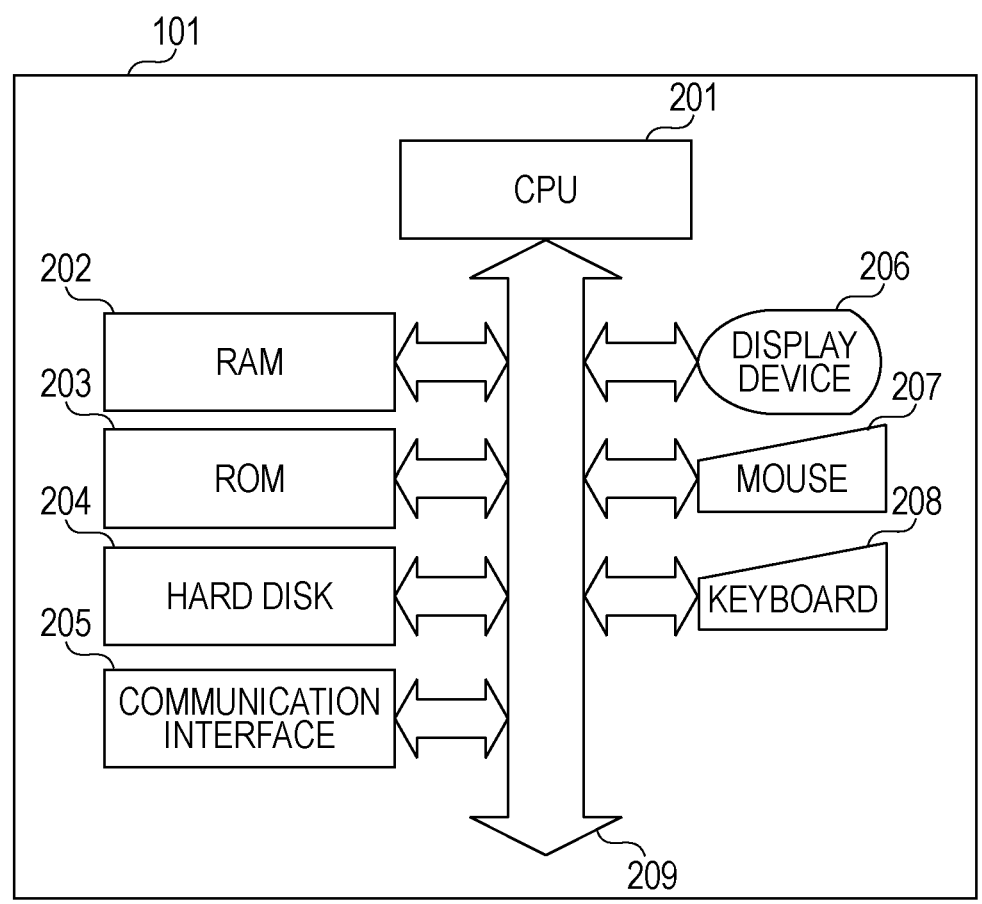
FIG. 2 is a block diagram illustrating the configuration of a PC 101.

FIG. 2 is a block diagram illustrating the configuration of the PC 101. A CPU 201 performs computation, determination, and control of data or commands in accordance with a program stored in a RAM 202, a ROM 203, or a hard disk 204. The RAM 202 is used as a temporary storage area when the CPU 201 performs various processing. The hard disk 204 has recorded thereon an operating system (OS), a browser, other application software, etc. That is, the CPU 201 performs various control by reading a program stored in the ROM 203 or the hard disk 204 to the RAM 202 and executing the program using the RAM 202 as a work memory.

A communication interface 205 is an interface for performing data communication with the printer 104, such as a USB, SCSI, or wireless interface, or a network interface for performing data communication with the WWW servers 103 via the Internet 102. A display device 206 includes a CRT or liquid crystal display and a graphic controller, and displays a graphical user interface (GUI). A mouse 207 and a keyboard 208 are input devices with which a user gives various instructions to the PC 101. A system bus 209 allows data exchange between the CPU 201 and the RAM 202, the ROM 203, the hard disk 204, and the like.

Figure 3:
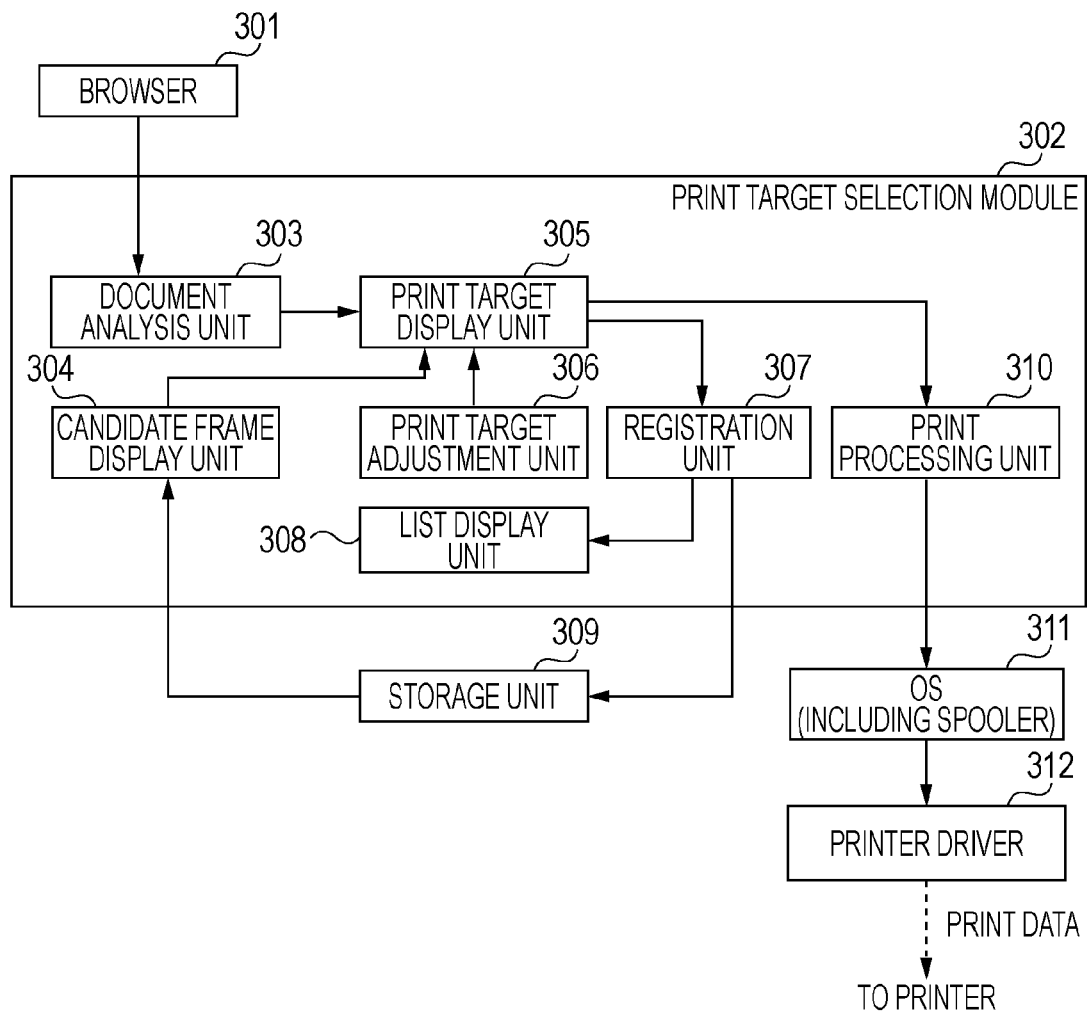
FIG. 3 is a block diagram illustrating the configuration of software on the PC 101.

FIG. 3 is a block diagram illustrating the configuration of software on the PC 101. Blocks illustrated in FIG. 3 are obtained by classifying programs saved in the ROM 203 or the hard disk 204 function-by-function, and those programs are executed by the CPU 201.

In FIG. 3, a browser 301 is an application for displaying a web page, and performs display control so that web pages on the WWW servers 103 are downloaded into the hard disk 204 of the PC 101 and are displayed on the display device 206. Web pages are displayed based on structured document files written in HTML, XHTML, or the like, and those structured document files are configured such that elements forming structured documents such as text and images are written using tags. A separate file called a Cascading Style Sheet (hereinafter abbreviated as CSS) for specifying the display style of the elements is further specified within the structured documents. The browser 301 analyzes the structured document files and displays the results on the display device 206.

In FIG. 3, a print target selection module 302 is plug-in software called from the browser 301. When a user issues an instruction to clip an image area targeted for print before performing printing, creation of a print preview, editing, or the like on the browser 301, the print target selection module 302 is executed.

In the print target selection module 302, a document analysis unit 303 analyzes a structured document in a corresponding web page that is being displayed using the browser 301 and also analyzes elements included in the structured document. A candidate frame display unit 304 acquires a clipping candidate frame file indicating the position of the print target area in the web page from a storage unit 309 described below, and performs display control to display a clipping candidate frame on the display device 206 in a selectable manner. In the display of a clipping candidate frame, several candidate frames are prepared and are displayed in a list in a thumbnail display form. The clipping candidate frame file is information indicating an area pattern to be clipped from the web page, and is stored in the storage unit 309 in advance, the details of which are described below.

A print target display unit 305 performs display control to present a print target area in the web page based on the clipping pattern indicated by a selected candidate, from among the clipping candidates displayed on the candidate frame display unit 304. Specifically, first, when a user selects a desired candidate by operating the mouse 207 or the like, an instruction is input in accordance with the operation. Then, based on the analysis result obtained by the document analysis unit 303, an element having a configuration similar to that of the pattern of the selected candidate frame is detected from among the elements included in the structured document, and is determined as a print target. Further, processing is performed so that an element that is not a print target on the display screen is hatched to facilitate easy distinction of the print target area. The details of the hatching processing are described below. However, the display method is not limited thereto, and any other display that allows distinction of a print target area, such as making an out-of-print-target area semi-translucent, may be used.

A print target adjustment unit 306 adjusts the size or position of the print target area displayed on the print target display unit 305 in accordance with an instruction input from the mouse 207 or the keyboard 208. That is, the user can perform operations such as movement, enlargement, and reduction by operating the mouse 207 as necessary, and can update a web page area specified as a print target by the print target display unit 305. Then, when a print target set button 508 described below is pressed and a user instruction is input, an image in the area displayed by the print target display unit 305 is determined as a print target. A registration unit 307 uses the determined print target area as a new clipping candidate frame, and creates a thumbnail image indicating the pattern of the print target area in the web page. A list display unit 308 displays a list in which the thumbnail image created by the registration unit 307 is added to the clipping candidate frames displayed by the candidate frame display unit 304.

When a cutting candidate frame registration button 510 described below is further pressed and an instruction is input, the registration unit 307 performs storage control for storing a clipping candidate frame file indicating the position of the determined print target area as a new clipping candidate frame in the storage unit 309. The storage unit 309 is a storage area for storing clipping candidate frames, and is provided in the ROM 203 or the hard disk 204.

Further, when the user inputs a user instruction by performing an operation for starting printing, a print processing unit 310 causes a printer driver 313 to execute drawing processing via an OS 311 in accordance with information about the arrangement of print layout elements. The OS 311 provides an API (Application Programming Interface) for allowing the print target selection module 302 to exchange print setting data from the printer driver 313 or an API for performing drawing processing. Further, the OS 311 includes various control software such as a spooler system for managing print jobs and a port monitor for outputting a printer command to a port, the details of which are omitted. The printer driver 313 generates print data in accordance with the drawing processing executed by the print processing unit 310, converts the generated print data into a printer command, and then transmits the printer command to the printer 104 via the OS 311. Then, the printer 104 prints an image on a sheet in accordance with the received printer command.

Figure 4:
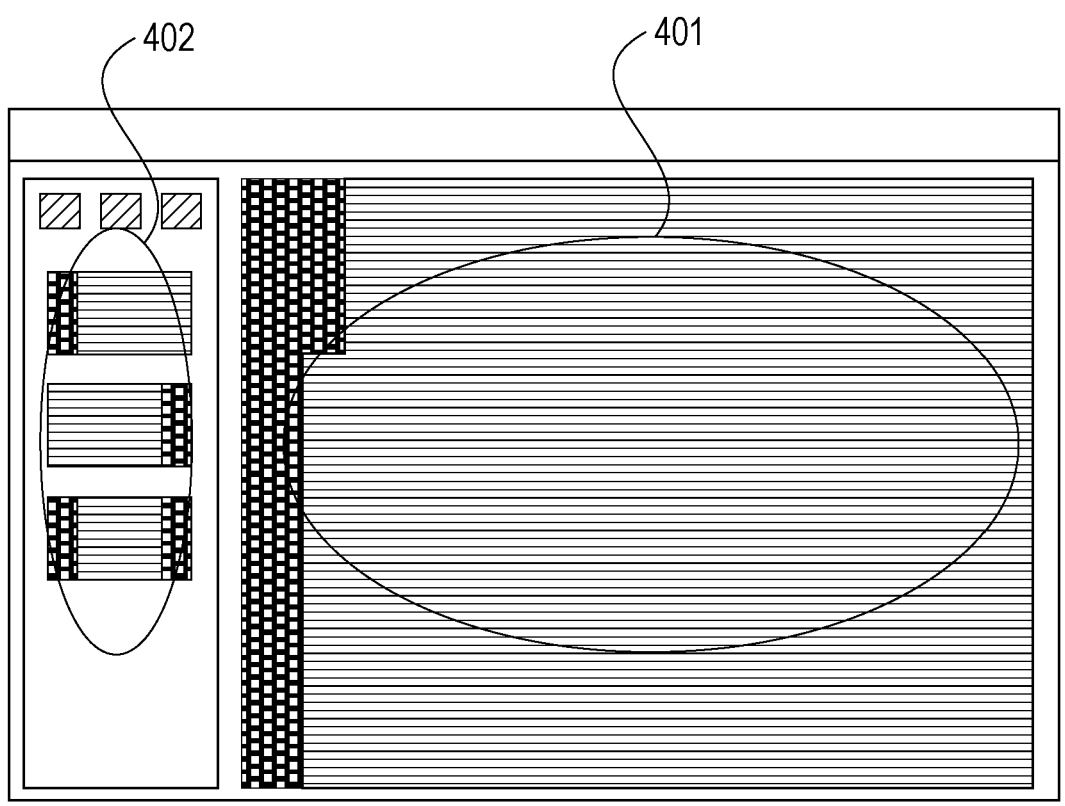
FIG. 4 is a diagram illustrating a browser window including a clipping candidate frame.

FIG. 4 is a diagram illustrating a browser window including a clipping candidate frame. The display of the browser window is performed by the candidate frame display unit 304 and the print target display unit 305. The display screen illustrated in FIG. 4 is displayed by pressing a button located in the window of the browser 301 on which, for example, a web page is displayed. An area 401 is an area where a web page displayed using the browser 301 is located and is hatched by using the process of the print target display unit 305. Further, in an area 402, display items corresponding to clipping candidate frame files read by the candidate frame display unit 304 from the storage unit 309 are displayed in a list. The display items represent area patterns to be clipped. Each of the displayed clipping candidate frames may be represented using an icon indicating an area to be clipped, or may be represented by creating and displaying a thumbnail image of an image hatched in a web page that is being displayed in the area 401. An icon or a thumbnail image indicating the position of a print target area in a web page may be included in a clipping candidate frame file, or may be stored in the storage unit 309 in correspondence with a candidate frame file.

Further, even before a user selects a clipping candidate frame, any of clipping candidate frames displayed in a list in the area 402 may be reflected in a web page displayed in the area 401 and displayed with hatching. In this case, based on the result of analysis of the structured document by the document analysis unit 303, an element is detected from among a plurality of elements included in the web page so that the print target area displayed in the area 401 is close to a clipping candidate frame displayed in the list, and an area corresponding to the detected element is displayed with hatching. As illustrated in FIG. 4, while a clipping candidate frame file represents linear boundaries, if elements near the boundaries in the web page are individually detected, areas to be actually hatched are not always displayed with lines.

A process for detecting an element, which is performed by the print target display unit 305, will be described using FIG. 4. First, in a web page that is being displayed in the area 401, position information about each element included in the web page is detected. The position information may be information written in a tag corresponding to an element included in a structured document such as an HTML document, or may be information written in CSS.

Then, the detected position information is compared with position information in the web page about boundaries that are made active/inactive as the print target indicated by a clipping candidate frame file to determine whether or not the element is included in the print target. As a result of the comparison, if an element near the boundaries indicated by the clipping candidate frame file is detected, whether or not the element is included in the print target may be determined in accordance with a predetermined standard. For example, if the boundaries of the clipping candidate frame overlap an element, whether or not the element is the print target may be determined in accordance with the distance between the border of the clipping candidate frame and the border of the element, or all the elements overlapping the boundaries of the clipping candidate frame may be determined as the print target.

While, here, an element included in a structured document file corresponding to a web page is directly searched for and an area is extracted, any other method, for example, creating an intermediate file such as EMF corresponding to the web page and extracting an element from the intermediate file, may be used. That is, any method that allows position information within a web page to be obtained may be used.

Further, position information about a print target area, which is indicated by a clipping candidate file, is, for example, coordinate information indicating coordinates in a web page. Then, in order to select a print target area in the web page, the coordinates indicated by the coordinate information included in the clipping candidate file are converted in accordance with the size of the web page that is being displayed using the browser 301 to calculate the coordinates of an area that is a print target candidate in the web page. Then, the coordinates are compared with the coordinates at which elements are located in the web page to detect an element that is a print target.

Figure 5:
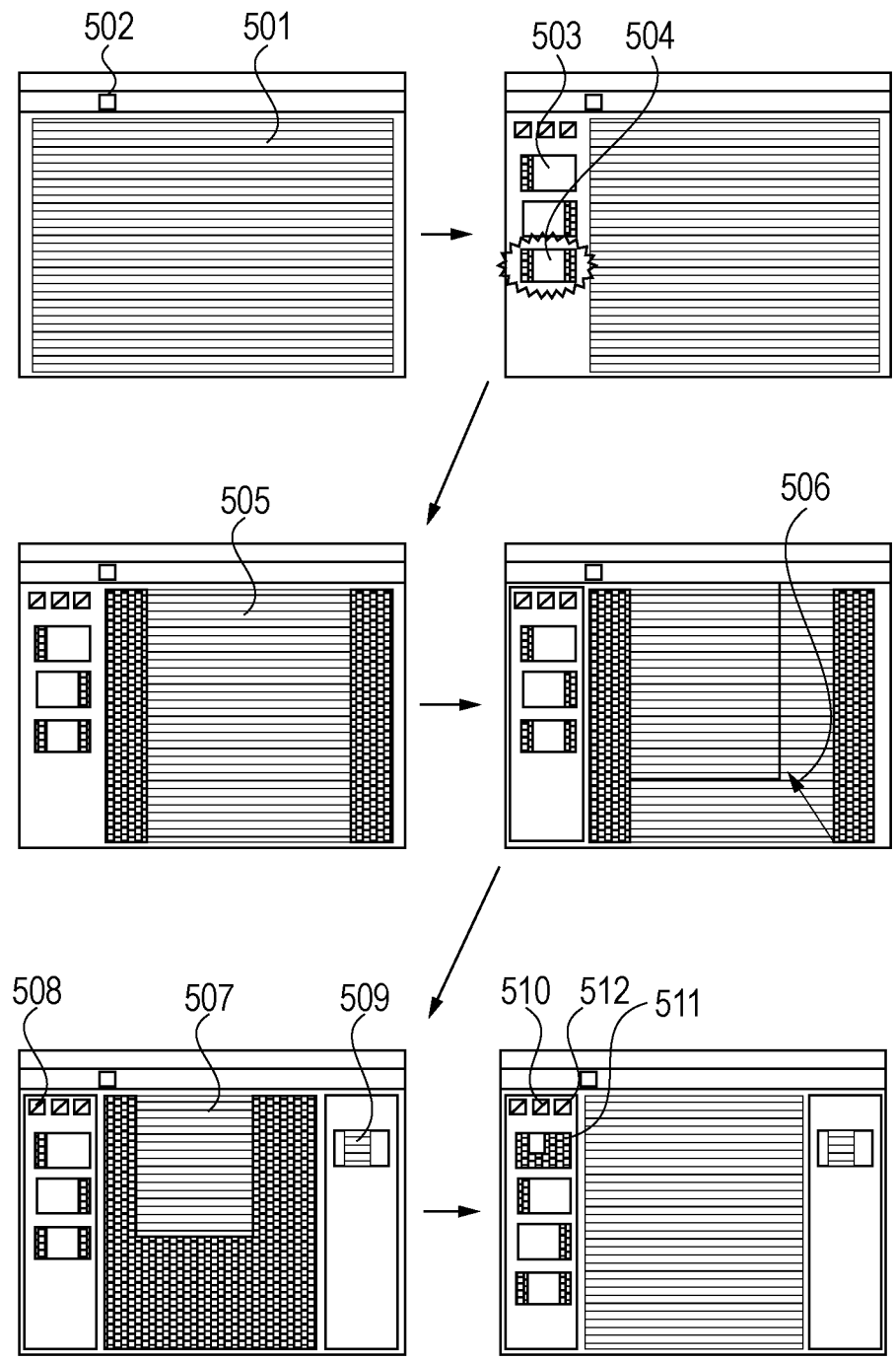
FIG. 5 is a display transition diagram until a clipping candidate frame is registered.

Next, the operation of selecting and adjusting a print target area and registering a clipping candidate frame according to this exemplary embodiment will be described using FIGS. 5 and 6. FIG. 5 is a display transition diagram until a clipping candidate frame is registered, and FIG. 6 is a flowchart illustrating a processing procedure performed until a clipping candidate frame is registered.

When the browser 301 displays a web page 501, an icon 502 for starting the print target selection module 302 serving as plug-in software for the browser 301 is displayed together with the web page 501. In this state, when a user inputs an instruction for selecting the icon 502 by operating the mouse 207 or the like, a process in the flowchart illustrated in FIG. 6 is started.

Figure 6:
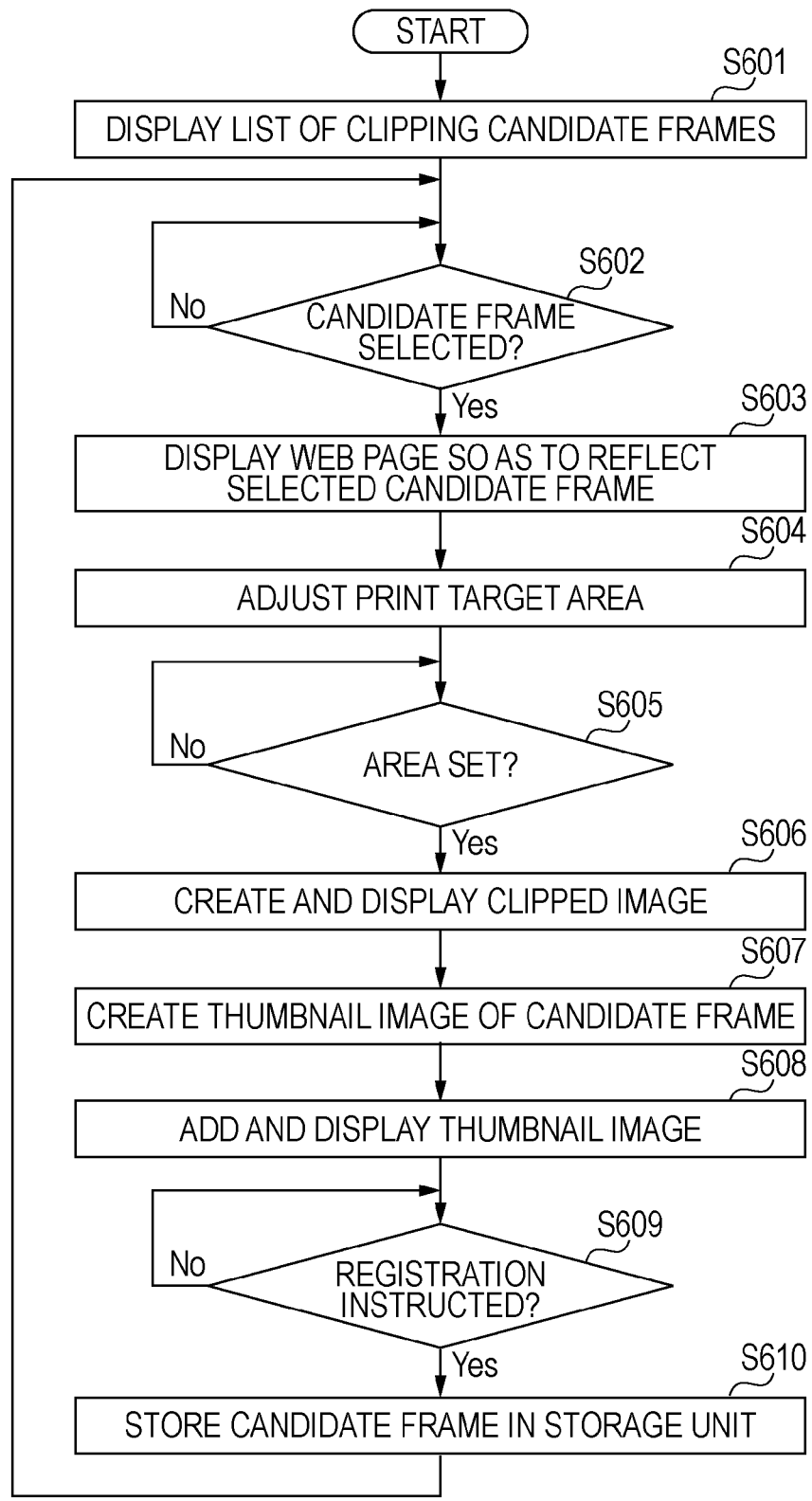
FIG. 6 is a flowchart illustrating a processing procedure performed until a clipping candidate frame is registered.

In the flowchart illustrated in FIG. 6, first, in S601, the candidate frame display unit 304 displays clipping candidate frames 503 stored in the storage unit 309 in advance in a list. In this state, the user can select a clipping candidate frame (for example, a clipping candidate frame 504) by performing an operation using the mouse 207 or the like. In S602, it is checked whether or not an instruction for selecting a clipping candidate frame, which is given by the user, has been input.

If the instruction has been input, the process proceeds to S603, in which the print target display unit 305 performs display to present a print target area in the web page that is being displayed in a manner reflecting the selection frame selected from within the list of clipping candidates. For example, as indicated by a web page 505, an area that is not a print target is hatched. The processing of S603 for reflecting the clipping candidate frame in the web page is executed by the print target display unit 305 described above, and an element at the position corresponding to the candidate frame selected by the user is determined as a print target element. Therefore, a print target area is determined.

In this state, the user can perform adjustment of the print area, such as movement, enlargement, and reduction, by operating the mouse 207 or the like. Then, in S604, if an instruction for adjusting the print area has been input, the print target adjustment unit 306 adjusts the print target area in accordance with the instruction. In this case, for example, an arrow indicated by 506 may be displayed in accordance with a reduction of the print target area.

In this manner, a user can adjust the area that the user wishes to print within a web page, and can further determine a print target area by pressing the print target set button 508. In S605, it is checked whether or not an instruction for determining the print target area has been input. If the instruction has been input, in S606, a clipped image 509 indicating the details of a determined print target area 507 is created and displayed. In FIG. 5, one clipped image is displayed by way of example. However, a clipped image may be added repeatedly each time a print target area is determined, and a list of clipped images may be displayed.

Then, in S607, the registration unit 307 uses the determined print target area as a new candidate, and creates a thumbnail image indicating the area. Then, in S608, the list display unit 308 uses the thumbnail image created in S607 as a new clipping candidate frame 511, and adds the thumbnail image to the clipping candidate frames already displayed in a list for display. Further, as illustrated in FIG. 5, in this case, the hatched display indicating the print target area in the web page is canceled.

Further, the user can store the created candidate frame 511 in the storage unit 309 by pressing the cutting candidate frame registration button 510 and making an instruction to register a candidate frame. Thus, in S609, it is checked whether or not an instruction for registering a candidate frame has been input. If the instruction has been input, in S610, information indicating the candidate frame 511 is stored in the storage unit 309.

The user can perform printing by pressing a print button 512 illustrated in FIG. 5, which is omitted herein because the above processing procedure describes a process for registering a clipping candidate frame. That is, if a print instruction is input by pressing the print button 512 in S602 or S605 in FIG. 6, the displayed print target area is printed by using the process of the print processing unit 310. Further, in S609, a print instruction can be made by selecting the clipped image 509 although the print target area in the web page is not presented.

Accordingly, the user can determine an area as a print target by selecting it from displayed clipping candidates, thus facilitating easier determination of a desired print area. Moreover, the user can adjust a print target area, and can further register a clipping candidate frame corresponding to the print target area.

Here, adjustment is performed on a print target area corresponding to a clipping candidate frame selected by a user, by way of example. However, the adjustment of a print target area is not limited thereto. For example, adjustment may be performed in a state where the entire web page is set as a print target area, or may be performed in a state where a predetermined print target area in a web page is selected. The registration of a clipping candidate frame is not limited to that of a print target area that is adjusted after the user selects a clipping candidate frame, and a clipping candidate frame corresponding to the print target area adjusted by the user may be registered.

Next, the processing of S601 in the flowchart illustrated in FIG. 6, in which clipping candidate frames are displayed in a list in the area 402 illustrated in FIG. 4, will be described. Specifically, a case where the display order is changed in accordance with the web page that is being displayed using the browser 301 will be described.

FIG. 7 is a diagram illustrating a clipping candidate frame pattern table, which is referred to in order to determine the order in which candidate frames are displayed when the clipping candidate frames are displayed. The clipping candidate pattern table is saved in the storage unit 309 together with the clipping candidate frames, and is read into the candidate frame display unit 304 when the icon 502 in the window of the browser 301 is pressed.

In the clipping candidate frame pattern table illustrated in FIG. 7, a display order item 701 indicates, for example, the previous display order of the clipping candidate frames, and the candidate frame display unit 304 changes the display order in accordance with the web page that is being displayed using the browser 301. An ID 702 is an ID for specifying a clipping candidate frame file for displaying a clipping candidate frame stored in the storage unit 309.

Further, a clipping candidate frame file 703 indicates the file name of a clipping candidate frame file. An associated web address 704 indicates the address of a web page that is displayed when the corresponding clipping candidate frame file is created, that is, location information on a network about the structured document corresponding to the web page. In the associated web address 704, the black star represents a clipping pattern that is registered by default, and indicates that the address of the corresponding web page does not exist.

In order to register a new clipping candidate frame in the pattern table, a new ID 702 is added, and a clipping candidate frame is created as a file 703 and is added to the pattern table in correspondence with the ID 702. At the same time, the address of the web page that is being displayed during the registration is written in the associated web address 704.

The clipping candidate frames displayed in the area 402 illustrated in FIG. 4 are displayed in the order based on the clipping candidate frame table. For example, if the display order item 701 illustrated in FIG. 7 is used, the thumbnail images of the clipping candidate frames are read from the storage unit 309 in sequence from the Top portion in accordance with the clipping candidate frame file 703.

However, if the address of the web page displayed using the browser 301 is included in the associated web address 704 in the clipping candidate frame pattern table, the ID 702 of the clipping candidate frame file corresponding to the address is moved to the Top. Thus, the clipping candidate frame corresponding to the web page that is being displayed can be displayed at an upper position in the display order. That is, when a web page with the same address is printed, the area that the user wishes to print in the web page may not possibly change and, therefore, the clipping candidate frame previously created is displayed with high priority.

If a plurality of candidate frames have been displayed for similar addresses, a candidate frame to be displayed with high priority for this address may be determined in accordance with the number of previous selections. Alternatively, a more newly selected candidate frame may be set as a candidate frame to be displayed with high priority for the address.

Furthermore, if the display order of clipped images is changed in the above manner, the pattern table may be updated in accordance with the display order. This is because of the following reasons: A web page to be printed next may possibly be a web page of a similar type even if the web addresses do not match, and web pages of similar types may possibly have similar configurations. Therefore, the print target area that the user wishes to print may possibly be similar to that in the previously displayed web page. In addition, even if the web address of the web page does not completely match that of the previously displayed web page, if it is determined that the configurations of the web pages are similar, such as in a case where portions of the web addresses match, the clipping candidate frame corresponding to the address may be displayed at an upper position in the display order. Alternatively, the display order may be determined by analyzing the configuration of a displayed web page and comparing the web page with the stored clipping candidate frame files. Furthermore, the number of previous selections of clipping candidate frames may be stored in a table, and the display order may be determined in accordance with the number of selections.

The above process allows a user to preferentially select a desired clipping candidate frame among clipping candidate frames displayed in a list, thus facilitating easier selection of a print target area.

According to this exemplary embodiment, therefore, a user selectively displays candidate frames indicating candidates of an area that is a print target in a web page, and an output target area from the web page is selected in accordance with a candidate frame selected by the user. Thus, the user can select a desired output target area without selecting an output target area for each web page.

In this exemplary embodiment, an element located in a web page is extracted in accordance with a clipping candidate frame selected by a user, and an area corresponding to the extracted element is determined as an output target area. However, for example, if image data such as bitmap or an intermediate file such as EMF, described above, is crated based on a web page, it is possible to extract an area corresponding to a portion of the element located in the web page. Therefore, an area corresponding to a clipping candidate frame selected by a user may be clipped from the image data or intermediate file corresponding to the web page.

Furthermore, the adjustment of the size or position of an area selected in accordance with a candidate frame allows a user to roughly specify an area as an output target by selecting a candidate frame and then to further adjust an output target area.

Furthermore, a new candidate frame can be registered based on an area of a web page specified by a user. Thus, for example, when a similar web page is output, a user can determine an output target area so as to reflect the previously specified output target area.

In the foregoing exemplary embodiment, description has been given of a case where a web page displayed based on a structured document is printed. However, the present invention is not limited thereto, and is designed to set a candidate frame of a print target area for various applications.

In the foregoing description, furthermore, an area extracted as an output target from a web page is displayed so that a user can distinguish the extracted area from other areas, and the output target area is printed. However, besides this, an area extracted as an output target from a web page may be printed without being displayed. Alternatively, an entire web page may be printed in such a manner that an area extracted from the web page can be distinguished from other areas.

Furthermore, an image in an output target area extracted from a web page may not only be printed but also be output in other forms such as being displayed on a display device or transmitted to an external device. In the foregoing exemplary embodiment, furthermore, description has been given of a case where the extraction of a print target area in a web page is implemented by cutting an image in a print target area. However, besides this, an image corresponding to a web page may be stored, and mask processing for replacing pixel values of an area other than the print target area with predetermined pixel values may be performed. In the exemplary embodiment, a method based on the mask processing is also included as an image extraction process.

In the foregoing exemplary embodiment, furthermore, description has been given of a case where the processing is performed by the PC 101. However, the present invention is not limited thereto, and the processing may be performed in a printer. In this case, a control unit provided in the printer serves as an image processing apparatus according to the claimed invention to execute processing, and a printing unit in the printer serves as an external printing device to which the image processing apparatus outputs an image.

Other Exemplary Embodiments

Furthermore, the present invention may also be implemented by executing the following processing: A software (program) implementing the functions of the foregoing embodiment is supplied to a system or an apparatus via a network or various storage media, and a computer (or a CPU, an MPU, or the like) of the system or the apparatus reads and executes the program. The present invention may also be implemented by a plurality of processors such as CPUs or MPUs by executing processing in cooperation with one another.

According to the present invention, a user can easily select an output target area in a web page.

The present invention is not to be limited to the foregoing embodiment, and a variety of changes and modifications can be made without departing from the spirit and scope of the present invention. Therefore, the appended claims which follow are provided to clearly define the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

201 CPU
202 RAM
203 ROM
204 hard disk
205 communication interface
206 display device
207 mouse
208 keyboard
209 system bus

The invention claimed is:

1. An image processing apparatus comprising:
a first determining unit configured to determine a first area in a first web page, in accordance with an instruction given by a user;
a display control unit configured to cause a display device to display a first image which corresponds to the first area determined by the first determining unit in the first web page, and to display a second image which corresponds to a second area in the first web page, wherein the first area and the second area are different from each other, and the first area overlaps a part of the second area;
a second determining unit configured to, in a case where an image corresponding to an area out of the first image and the second image displayed by the display control unit is designated by a user, determine an output target area corresponding to the designated image, in a second web page which is different from the first web page and includes a plurality of elements, by specifying one or more output target elements corresponding to the area corresponding to the designated image in the first web page from the plurality of elements; and
an output unit configured to output the output target area in the second web page determined by the second determining unit.

2. The image processing apparatus according to claim 1, further comprising an adjusting unit configured to adjust the first area determined by the first determining unit in the first web page in accordance with an instruction given by a user,
wherein the display control unit causes the display device to display the first image which corresponds to the first area adjusted by the adjusting unit.

3. The image processing apparatus according to claim 2, further comprising a creating unit configured to create the first image indicating the first area in first the web page adjusted by the adjusting unit,
wherein the display control unit causes the display device to display the first image created by the creating unit.

4. The image processing apparatus according to claim 1, wherein the output unit outputs the output target area in the second web page determined by the second determining unit and another area in the second web page in a manner distinguishable from each other.

5. The image processing apparatus according to claim 1, wherein the output unit outputs the output target area in the second web page determined by the second determining unit, and does not output another area in the second web page.

6. The image processing apparatus according to claim 1, wherein the output unit causes a printing device to print the output target area.

7. The image processing apparatus according to claim 1, wherein the output unit causes a display device to display the output target area.

8. An image processing method comprising:
determining a first area in a first web page, in accordance with an instruction given by a user;
causing a display device to display a first image which corresponds to the determined first area in the first web page, and to display a second image which corresponds to a second area in the first web page, wherein the first area and the second area are different from each other, and the first area overlaps a part of the second area;
in a case where an image corresponding to an area out of the displayed first image and the displayed second image is designated by a user, determining an output target area corresponding to the designated image, in a second web page which is different from the first web page and includes a plurality of elements, by specifying one or more output target elements corresponding to the area corresponding to the designated image in the first web page from the plurality of elements; and
outputting the determined output target area in the second web page.

9. A non-transitory computer readable storage medium storing a program for causing a computer to execute the image processing method according to claim 8.

10. The image processing method according to claim 8, further comprising adjusting the first area determined in the first web page in accordance with an instruction given by a user,
wherein the display device displays the first image which corresponds to the adjusted first area.

11. The image processing method according to claim 10, further comprising creating the first image corresponding to the first area in the first web page adjusted by the adjusting,
wherein the display device displays the created first image.

12. The image processing method according to claim 8, wherein the outputting the output target area includes outputting the output target area in the second web page, and another area in the second web page, in a manner distinguishable from each other.

13. The image processing method according to claim 8, wherein the outputting the output target area includes outputting the output target area in the second web page, and does not output another area in the second web page.

14. The image processing method according to claim 8, wherein the outputting the output target area includes causing the printing device to print the output target area.

15. The image processing method according to claim 8, wherein the outputting the output target area includes causing the display device to display the output target area.

16. The image processing apparatus according to claim 1, wherein each of the first area and the second area includes a part where the first and the second areas overlap with each other and a part where the first and the second areas do not overlap with each other.

17. The image processing apparatus according to claim 1, wherein the display control unit configured to cause the display device to display the image which indicates the second web page and an area in the second web page corresponding to the area determined by the first determining unit in the first web page.

18. The image processing apparatus according to claim 1, wherein in a case where the first determining unit determines areas in different web pages, the display control unit causes the display device to display a plurality of images corresponding to the areas, in accordance with a display order which is based on the second web page and the different web pages.

19. The image processing method according to claim 8, wherein each of the first area and the second area includes a part where the first and the second areas overlap with each other and a part where the first and the second areas do not overlap with each other.

20. The image processing method according to claim 19, wherein the causing the display device to display the first image and the second image includes causing the display device to further display a third image indicating a third area in the first web page corresponding the part where the first area and the second area overlap with each other.

21. The image processing apparatus according to claim 17, wherein the display control unit causes the display device to further display a third image indicating a third area in the first web page corresponding the part where the first area and the second area overlap with each other.

* * * * *